United States Patent [19]

Kelm

[11] Patent Number: 4,631,993
[45] Date of Patent: Dec. 30, 1986

[54] GROOVING TOOL AND METHOD FOR MAKING SAME

[75] Inventor: Walter H. Kelm, Mt. Clemens, Mich.

[73] Assignee: General Electric Company, Detroit, Mich.

[21] Appl. No.: 266,608

[22] Filed: May 22, 1981

Related U.S. Application Data

[63] Continuation of Ser. No. 948,884, Oct. 5, 1978, abandoned.

[51] Int. Cl.$^4$ .................. B23B 1/00; B23B 29/04; B26D 1/00
[52] U.S. Cl. ...................... 82/1 C; 82/36 R; 407/101
[58] Field of Search ............... 82/36 R, 1 C; 407/101; 76/101 R

[56] References Cited

U.S. PATENT DOCUMENTS

| | | | |
|---|---|---|---|
| 3,534,457 | 10/1970 | Mueller | 407/101 |
| 3,543,363 | 12/1970 | Diemond | 407/101 |
| 3,545,318 | 12/1970 | Anderson | 82/36 R |
| 3,758,927 | 9/1973 | Stein | 407/101 |
| 3,844,008 | 10/1974 | Sletten | 407/101 |
| 4,118,138 | 10/1978 | Takacs | 407/101 |

FOREIGN PATENT DOCUMENTS

| | | | |
|---|---|---|---|
| 119530 | 4/1927 | France | 82/36 R |
| 921602 | 3/1963 | United Kingdom | 82/36 R |

OTHER PUBLICATIONS

"Indexible (Throw-Away) Insert Holders", USAS, B94.26, 1969.

"Precision Holders for Indexible Inserts", ANSI, B94.45, 1979.

*Primary Examiner*—Leonidas Vlachos
*Attorney, Agent, or Firm*—Hedman, Gibson, Costigan & Hoare

[57] ABSTRACT

The machine tool parts and method of making same includes providing cooperating attachment means between the shank and the tool bit head assembly, wherein a predetermined portion of the attachment means on the shank is located a first predetermined distance from a fixed reference on the shank and the cutting edge of the tool bit head assembly is located a fixed predetermined distance from a portion of the attachment means on the tool bit head assembly, corresponding to the predetermined portion of the shank attachment means, with the additive sum of the first and fixed predetermined distances defining a predetermined cutting height of the cutting edge. Preferably, the attachment means comprise a key formed on the head assembly and a correspondingly proportioned key-way formed on the shank. The fixed reference on the shank is its bottom surface and the predetermined positions on the attachment means are the lowermost abutting edges of the key and key-way. In addition, any increase or decrease to the cutting height is added or subtracted at the bottom surface of the shank. Advantageously, the tool bit head assembly includes only a support plate which supports the tool bit insert and on which the key is formed and a clamp member which is fastened directly to the support plate to clamp the insert against the support plate and which includes locating means cooperating only with the support plate for positively locating its clamping arm portion with respect to the desired location for the tool bit insert.

9 Claims, 14 Drawing Figures

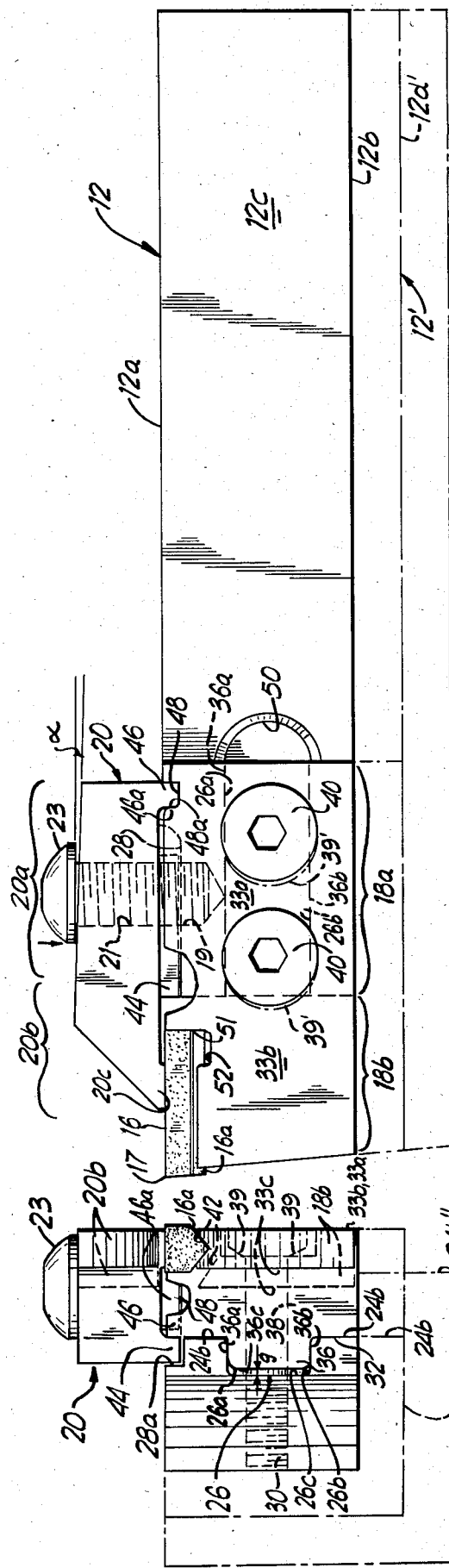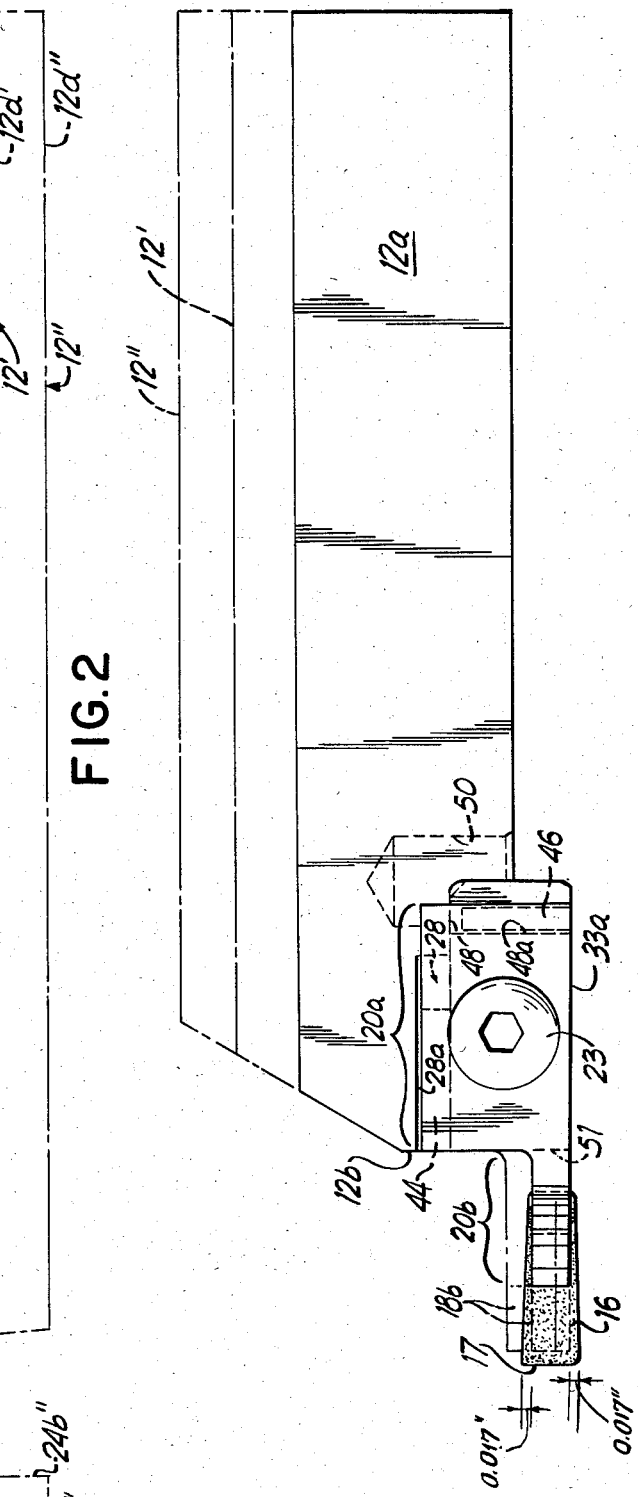

GROOVING TOOL AND METHOD FOR MAKING SAME

This is a continuation of application Ser. No. 948,884 filed Oct. 5, 1978, abandoned.

BACKGROUND AND OBJECTS OF THE INVENTION

The present invention relates generally to machine tools and, more particularly, to new and improved cut-off and/or grooving tool parts therefor and methods of making same.

The art is replete with machine tools such as lathes and the like adapted to rotate a workpiece for machining a groove on the inner diameter, the outer diameter or the end face of the workpiece or even to cut completely through a solid bar. In such machines, a tool bit insert, formed with a sharp cutting edge and made of hardened material such as tungsten-carbide, is mounted to a relatively massive shank by a head assembly which is supposed to positively locate the cutting edge of the tool bit insert relative to a predetermined reference position (usually the bottom surface) of the shank. The shank is then securely placed in the machine wherein the workpiece and the cutting edge are brought together so that as the workpiece is rotated, a groove is cut in the workpiece or, if the cutting edge "travels" to the center of the workpiece, a portion of the workpiece is completely cut off.

Numerous designs have been developed for head assemblies intended to achieve certain desirable characteristics in the tool. For example, some head assemblies are particularly designed to ensure that the cutting is squared relative to certain reference parts. Other designs are intended to permit adjustment of the cutting edge. However, in most, if not all, of these designs, numerous parts (usually at least a back-up plate behind the insert) are used for locating the cutting edge. Although such configurations have provided satisfactory results in some applications, they do suffer certain drawbacks, particularly in view of the multiple surfaces abutting one another seriatim, which could cause the resultant position of the cutting edge to be outside the acceptable range of tolerances.

Recently, with the advent of computerized tooling, certain uniform standards have been developed for locating the cutting edge relative to a predetermined reference and it is critical that the cutting edge be positioned within prescribed tolerances. The most widely used standard is that developed by A.N.S.I. which locates the outer end point of the cutting edge relative to the bottom surface of the shank by the combination of its distance (designated "B", the cutting height) above that surface, by its distance (the "C" dimension) from the back edge (or butt) of the shank and by its distance (the "F" dimension) from the opposite side of the shank. Although tool parts have been made and qualified to A.N.S.I. standards, there has been no tooling assembly (i.e., head assembly and shank combination) which enables easy interchange of one cutting edge with another without having to re-set, or re-qualify, the tooling assembly according to the A.N.S.I. standard. Similarly, there is no tooling assembly in which head assemblies are interchangeable on a particular shank with the resultant tooling assembly still A.N.S.I. qualified nor is there a tooling assembly which permits easy replacement of damaged tool bit inserts.

Notwithstanding the A.N.S.I. standards, it is important that the support capability provided by the head assembly is sufficiently strong to prevent a portion of the head assembly from being broken due to shear forces generated during the tooling operation. It is also important that the mounting means between the shank and the head assembly be sufficiently strong to prevent the head from being sheared off the shank.

Accordingly, it is an object of the present invention to provide new and improved tooling parts and method for making same. It is also an object of the invention to provide new and improved tooling parts and method for making same, whereby a strong tooling assembly is provided with a minimum number of component parts.

It is another object of the invention to provide new and improved tooling parts and method for making same, which enables interchangeability of tool bit head assemblies on any shank.

It is a further object of the invention to provide new and improved tooling parts and method for making same, which enables interchangeability of tool bit head assemblies (at least for head assemblies intended to perform the same function—i.e., grooving or cut-off) on any given shank with automatic qualification to A.N.S.I., or any other similar standards.

It is yet another object of the invention to provide new and improved tooling parts and method for making same, which provides sufficiently strong support for the tool bit insert to withstand the forces generated during operation of the machine tool. Further, the tooling parts are to include attachment means for mounting the head assembly to the shanks, adapted to prevent relative rotational movement, or "chattering", therebetween.

Objects and advantages of the invention are set forth in part herein and in part will be appreciated herefrom, or may be learned by practice with the invention, the same being realized and attained by means of the methods, steps, instrumentalities and combinations pointed out in the appended claims. Accordingly, the invention resides in the novel steps, operations, parts, constructions, arrangements, combinations and improvements herein shown and described.

SUMMARY OF THE INVENTION

Briefly described, the machine tool parts and method of making same, according to the present invention includes providing cooperating attachment means between the shank and the tool bit head assembly, wherein a predetermined portion of the attachment means on the shank is located a first predetermined distance from a fixed reference on the shank and the cutting edge of the tool bit head assembly is located a fixed predetermined distance from a portion of the attachment means on the tool bit head assembly, corresponding to the predetermined portion of the shank attachment means, with the additive sum of the first and fixed predetermined distances defining a predetermined cutting height of the cutting edge. As preferably embodied, the attachment means comprise a key formed on either the head assembly or the shank and a correspondingly proportioned key-way formed on the other. The fixed reference on the shank is its bottom surface and the predetermined positions on the attachment means are located along the lowermost abutting edges of the key and key-way.

Also as preferably embodied, a family of head assemblies are formed, wherein the corresponding fixed predetermined distances of all of the head assemblies are identical. In addition, any increase or decrease to the cutting height is added or subtracted at the bottom surface of the shank.

According to another aspect of the invention, the tool bit head assembly includes only a support plate which supports the tool bit insert and on which the attachment means are formed and a clamp member which clamps the insert to the support plate. As preferably embodied, the clamp is fastened directly to the support plate and includes locating means cooperating only with the support plate for positively locating the clamping arm portion of the clamp with respect to the desired location for the tool bit insert. Advantageously, the locating means include a pair of orthogonally oriented ribs—one adapted to engage the support plate along the same surface on which the attachment means are formed, and the other adapted to reside within a slot-like recess formed in the top of the support plate.

It will be apparent from the foregoing general description that the objects of the invention specifically enumerated herein are achieved by the invention as herein disclosed. Thus, the tool bit head assembly and shank formed in accordance with the present invention has been found to be relatively easy and inexpensive to fabricate. Moreover, assembly of the head assembly and shank made in accordance with the present invention can be accomplished very quickly and easily, and enables quick and easy replacement of worn parts, particularly the tool bit insert.

It will also be found that by forming the head assembly and the shank in accordance with the present invention, the cutting edge of the tool bit insert is accurately and positively located with a minimum of parts. In addition, by forming a plurality of head assemblies with identical corresponding fixed predetermined distances, any head assembly (at least all those intended for the same tooling function—e.g., grooving or cut-off) can be mounted to a given shank and automatically identically qualified according to A.N.S.I. or any other appropriate standard.

Moreover, by adding to or subtracting from the bottom surface of the shank the distance by which the cutting height is to be increased or decreased, respectively, it will be found that any head assembly (at least any intended to perform the same tooling function) can be mounted to any shank and will be automatically identically qualified.

It will be understood that the foregoing general description as well as the following detailed description are exemplary and explanatory of the invention but are not restrictive thereof. Thus, the accompanying drawings, referred to herein and constituting a part hereof, illustrate preferred embodiments of the invention and, together with the detailed description, serve to explain the principles of the invention.

BRIEF DESCRIPTION OF THE DRAWINGS

FIG. 2 is a side view, with partial cut-away, of the embodiment shown in FIG. 1.

FIG. 3 is a front end view of the embodiment shown in FIG. 1.

FIG. 4 is a top view of the embodiment shown in FIG. 1.

DETAILED DESCRIPTION OF PREFERRED EMBODIMENT

Figure 1:
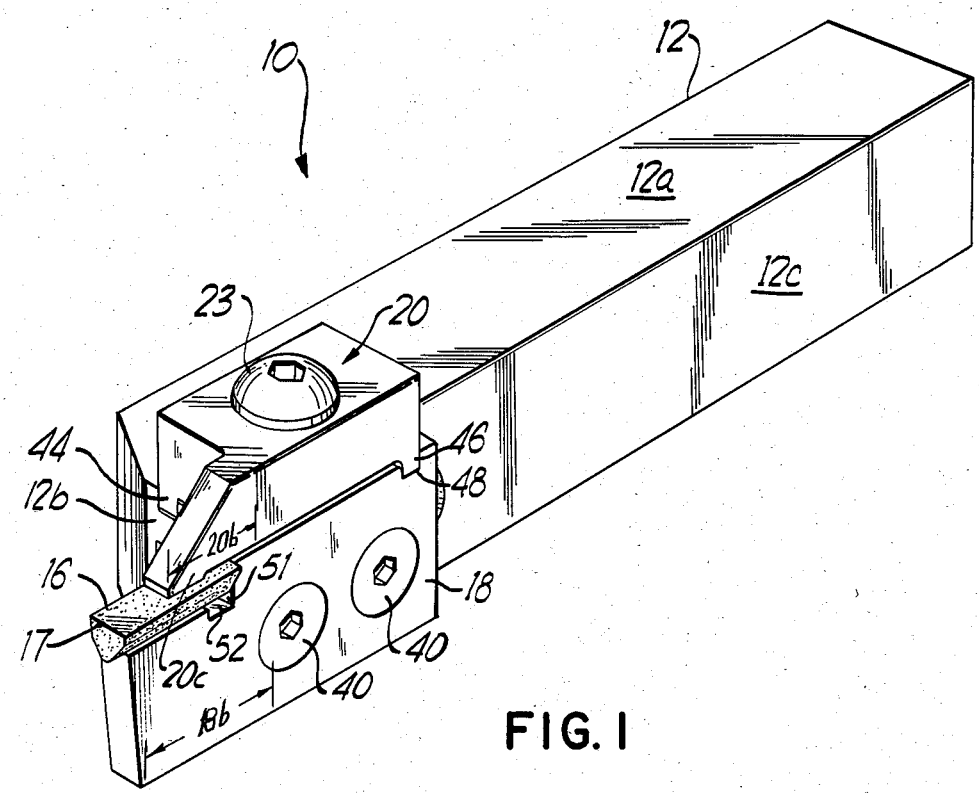
FIG. 1 is a perspective view of an embodiment of a grooving tool assembly according to the invention.

Referring now generally to the embodiments of the present invention shown in the accompanying drawings, wherein like reference numbers designate like parts throughout the various views, FIGS. 1–7 illustrate various views of the components of a grooving tool assembly (indicated generally at 10) made in accordance with the present invention.

As here embodied, tool assembly 10 includes a generally elongate and relatively heavy shank member (12) adapted to be secured to a machine tool (not shown), such as a lathe or the like, and a head assembly (designated generally at 14) adapted to be attached to shank 12. Tool head assembly 14 includes a tool bit insert (16), having at least one cutting edge (indicated at 17) which is adapted to cut into or form the desired pattern in a workpiece, typically a metal bar or a pipe (not shown) mounted in the machine tool, and it is also adapted to mount insert 16 to the shank and locate cutting edge 17 at a predetermined position (the "cutting height") relative to a reference (typically the bottom surface) on shank 12. As preferably embodied, the head assembly includes only two elements for supporting the insert and locating the cutting edge—a support plate (18) which is adapted to provide the primary support for insert 16 and a clamp member (20) which is adapted to cooperate with support plate 18 for clamping insert 16 to fixedly locate its cutting edge (17) in the desired position. Also, as preferably embodied, support plate 18 is adapted to be mounted directly to shank 12, clamp 20 is adapted to be secured directly to support plate 18, and the clamping portion of clamp 20 is located by means (described more fully hereinafter) associated only between the clamp and support plate 18.

Figure 6:
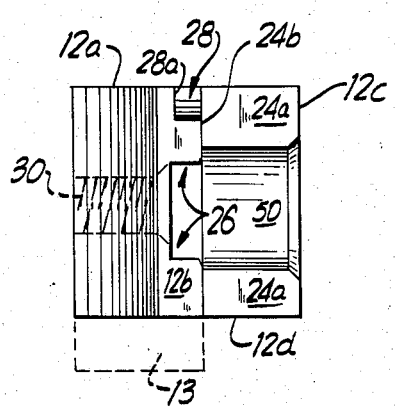
FIG. 6 is a front end view, similar to that shown in FIG. 3, of the shank portion of the embodiment shown therein.
Figure 5:
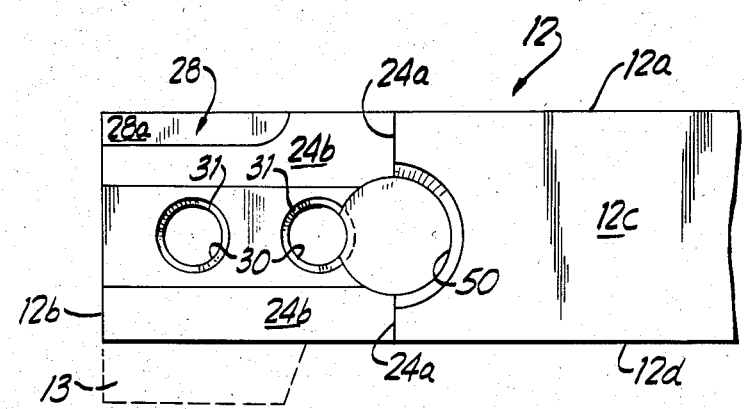
FIG. 5 is a side view, similar to that shown in FIG. 2, of the shank portion of the embodiment shown therein.
Figure 7:
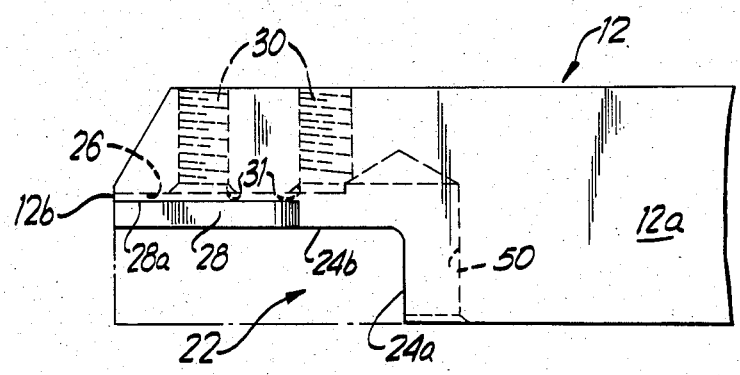
FIG. 7 is a top view, similar to that shown in FIG. 4, of the shank portion of the embodiment shown therein.

Turning now to FIGS. 5–7, shank 12 has a generally square cross-section, although it will be understood that the present invention is applicable to shanks having any desired cross-sectional configurations, and the butt (or back end) of shank 12 is suitably proportioned for mounting in the desired machine tool. The head (or front end) of shank 12 has a cut-out (indicated at 22) in one corner (depending on whether tool assembly 10 is for "right-handed" or "left-handed" applications), adapted to receive the tool head assembly. Cut-out 22 is adapted to receive at least a portion of the tool head assembly to help locate the cutting edge (17) and may be in the form of a corner-like recess which defines a front-facing back surface (24a) on shank 12 and a side-facing side surface (24b), preferably extending parallel to the longitudinal axis of the shank. Surfaces 24a and 24b should be perfectly flat, within the usual acceptable tolerances, and preferably extend perpendicular to each other.

According to the invention, side surface 24b is formed with a slot-like recess or key-way (indicated generally at 26) extending its entire length and proportioned to receive a rib-like projection or key (indicated at 36 in FIGS. 2-4) formed on support plate 18, as will be described more fully hereinafter. A relatively narrow and shallow slot (28) is also formed in the top surface (indicated at 12a) of shank 12, beginning at a predetermined location in front of back surface 24a and extending all the way to the front edge surface (indicated at 12b) of the shank, for accommodating a rib-like locating member formed on clamp 20, which will be described more fully hereinafter. Advantageously, the beginning of recess 28 is curved to prevent high concentration of stress which could otherwise occur at a cast 90° corner.

Two threaded holes (each designated 30) are formed in shank 12, beginning at surface 24b and extending into the shank, preferably through to the opposite side thereof to accommodate any length threaded fastener. (Of course, it will be understood that such threaded fastener should not protrude beyond the opposite side surface of the shank). As preferably embodied, threaded holes 30 are formed within key-way 26 to enable secure attachment of the support plate to the shank directly at the key-way (26) and the key (36 in FIG. 3). Advantageously, the end portions of the boreholes opening into key-way 26 are slightly counter-sunk (as indicated at 31) to facilitate initial threading of the threaded fasteners used to secure support plate 18 to the shank, as will be described more fully hereinafter.

Referring now to FIGS. 2-4, support plate 18 includes a relatively thickened mounting portion (indicated at 18a) which is adapted to be fastened to shank 12 and a relatively thin blade portion (indicated 18b) which is adapted to provide a seat for the tool bit insert (16). Mounting portion 18a is formed with a perfectly flat (i.e., within the usual tolerances) side wall surface (indicated at 32) for abutting side surface 24b of shank 12 and a similarly flat back wall surface (34) which is adapted to abut back surface 24a of the shank and is, therefore, perpendicular to surface 32. As indicated above, mounting portion 18a also includes rib-like key 36 projecting outwardly from surface 32. Key 36 is proportioned to correspond to the configuration of key-way 26 for interlocking engagement therewith and to enable surfaces 34 and 24b to abut each other over their entire corresponding surface portions. The top and bottom edge portions (36a and 36b, respectively) of key 36 are adapted to abut or almost abut, the top and bottom edges (26a and 26b, respectively) of key-way 26 but a gap (g in FIG. 3) is provided between the remaining surfaces (26c and 36c), as will be described below.

In order to fasten support plate 18 to shank 12, two holes (each designated 38), which need not be threaded, are formed in mounting portion 18a (which is about as long as surface 24b), extending through key 36 and positioned relative to its edges (36a and 36b) so that they align with threaded holes 30 when support plate 18 is mounted to shank 12. Thus, the distance between the centers of holes 38 and the edges (36a and 36b) of key 36 should be virtually equal to the corresponding distances between the centers of holes 30 and the corresponding surfaces (26a and 26b, respectively) of key-way 26.

The blade portion (18b) of support plate 18 is adapted to provide a seat for the tool bit insert (16). Thus, for example, its top surface is formed with a V-shaped groove (indicated at 42 in FIG. 3) proportioned to receive a correspondingly proportioned edge portion (indicated at 16a) of insert 16. As preferably embodied, groove 42 and insert edge 16a (which does not come to a sharp point) are each formed at an angle of about 100° rather than 90° because of the greater stability when assembled and a much less likelihood of cracking along the vertex of the "V". It will be understood that the width of the blade portion 18b is preferably narrower (by about 0.017" along each side) than the length (indicated at W in FIG. 11) of the cutting edge (17) of insert 16 to permit release of blade portion 18b from the groove made in the workpiece and help prevent jamming during the grooving operation.

Clamp member 20 includes a base portion (20a) adapted to be secured to the tooling assembly, preferably only to support plate 18, and an arm portion (20b) adapted to engage the top surface of insert 16 for fixedly clamping against the top of insert 16 in a vice-like grip with the grooved blade portion 18b. Base portion 20a includes locating means, preferably co-acting only with support plate 18, for properly locating its clamping arm portion (20b) relative to blade portion 18b. In addition, base portion 20a includes an unthreaded hole (21), extending therethrough for accommodating a threaded fastener (23) which affixes clamp 20 to support plate 18, by screwing into a threaded hole (19) formed in the top surface of mounting portion 18a.

As here embodied, the locating means include a longitudinal rib (44) formed along one bottom edge of clamp base portion 20a (preferably extending parallel to arm portion 20b) and a transverse rib (46) formed on another bottom edge of base portion 20a and preferably extending perpendicular to longitudinal rib 44. To accommodate transverse rib 46, support plate 18 is formed with a slot-like recess (48) which is slightly wider than the thickness of rib 46 and positioned so that the front-facing edge (46a) of rib 46 abuts the corresponding edge (48a) of recess 48 when clamp 20 is fastened to support plate 18 to help locate arm portion 20b properly over blade portion 18b.

The inside side edge (44a) of longitudinal rib 44 is preferably adapted to abut a reference surface (preferably surface 32) of support plate 18 to enhance the alignment location provided by the rib/recess 46/48 combination. Support plate 18 will, thus, need not be formed with a recess (like recess 48) to accommodate longitudinal rib 44 and, since the inside edge surface of rib 44 abuts the same flat surface (32) that abuts surface 24b of shank 12, proper alignment will be insured. Thus, recess 28 in shank 12 is not needed for locating purposes but need only provide sufficient clearance to accommodate longitudinal rib 44. As a result, arm portion 20b is positively located over the blade portion (18b) of support plate 18 by two locating structures yet without having to depend on shank 12.

However, as preferably embodied, recess 28 in shank 12 is dimensioned so that the vertically extending wall surface (28a) is no more than about 0.003" from the adjacent surface on rib 44 to prevent the free end of arm portion 20b from rotating beyond the projected area defined by outermost edges of the cutting edge (17) of insert 16. Thus, if the arm portion (20b) of clamp 20 begins to rotate about fastener 23 (since there is some clearance between the walls of recess 48 and rib 46 when situated therein), rib 44 will bear up against surface 28a to prevent excursion of the free end of arm 20b beyond a pair of parallel lines each of which intersects an end of cutting edge 17. Advantageously, the thickness of arm portion 20b and that of blade portion 20b are essentially equal to facilitate release of the cutting edge from a groove formed in the workpiece and to provide chip clearance.

The front edge portion of clamp arm portion 20b includes a slightly projecting shoulder (20c), the bottom surface of which is adapted to engage the top surface of insert 16 in accordance with conventional tool design practices. Thus, for example, shoulder 20c will be positioned to reside over a portion of the insert directly supported by the grooved blade portion (18b), rather than the notch (52) which is usually formed to facilitate formation of the V-shaped notch.

The depth of recess 48 is preferably less than the height of transverse rib 46 which can, thereby, act as a fulcrum heel in recess 48 since the recess is slightly wider than rib 46. The height of rib 46 is further proportioned so that when clamp 20 is secured to support plate 18, there is a slight gap between its bottom surface and the top of mounting portion 18a, and the top surface of clamp 20 is inclined at a slight angle (indicated at α in FIG. 2) of about 2°-3° with the bottom surface of the head of threaded fastener 23. In this way, the point at which the clamping force (indicated by the arrow in FIG. 2) acts on insert 16 will be as far forward possible relative to rib/fulcrum 46 to maximize the clamping force.

As further preferably embodied, borehole 19/21 (for securing clamp 20 to support plate 18) may be formed farther forward of rib/recess 46/48 than illustrated herein, and may even extend into the front borehole 38 in the support plate. In this way, an even greater leverage will be achieved from the clamping force of fastener 23 for maximizing the clamping effect on insert 16. However, fastener must not be too long, otherwise it will protrude into the borehole 38 and abut the threaded fastener (40) therein.

According to one aspect of the present invention, a predetermined portion (preferably, the bottom edge/surface 26b) of key-way 26 is located a predetermined distance from a fixed reference (preferably bottom surface 12d) on shank 12 and cutting edge 17 is positioned a fixed distance above the corresponding portion (i.e., edge/surface 36b) of key 36, with the additive sum of the predetermined distance and the fixed distance equalling a predetermined cutting height for the shank. Also as preferably embodied, a family of support plates are formed, each plate adapted to support a different tool bit insert and formed with the distance between the cutting edge of its corresponding insert and the bottom edge (36b) of its key 36 equal to said fixed distance so that all are interchangeable on a given shank and the same predetermined cutting height will automatically be achieved. Moreover, other corresponding attachment dimensions between the shank and the various support plates are made equal to render the plates automatically qualifiable on a given shank or even on different shanks, as will be described more fully hereinafter.

To this end, and as preferably embodied, the distance between surface 32 on mounting portion 18a and the opposite surface (33a) thereof (which surface is also co-planar with outer surface 33b of blade portion 18b) is identical for all support plate members. Moreover, for tooling wider grooves in the workpiece (i.e., for supporting wider tool bit inserts), blade portion 18b is widened by adjusting the location of its inner surface (33c) relative to outer surface 33b, as indicated in phantom in FIGS. 3 and 4, the width (H in FIG. 11) of mounting portion 18a remaining constant. Thus, since the difference between the length of cutting edge 17 and the thickness of blade portion 18b is always the same. (a total of 0.34" as indicated in FIG. 4) regardless of the length (W in FIG. 11) of the cutting edge, a given shank will always be identically qualifiable (under A.N.S.I. qualifying techniques), at least for the F dimension, regardless of which head assembly is used. Thus, if all dimensions fall within A.N.S.I. tolerances, the interchangeable parts will be identically qualified.

Also identical in all head assemblies is the size of each key 36, particularly the width thereof (i.e. the distance between surfaces 36a and 36b), while the width of each key-way 26 (i.e., the distance between surfaces 26a and 26b) is similarly identical for each shank. In addition, as indicated above, the cutting height (B in FIG. 12, measured from bottom surface 12d of the shank to cutting edge 17) for the combination of any head assembly with a given shank is adapted to be identical.

To this end, the distance (indicated at $B_2$ in FIG. 12) between the bottom edge (36b) of key 36 on any support plate 18 and the cutting edge (17) of the insert corresponding to such support plate is fixed and, therefore, identical for all support plates. In addition, the distance (B, in FIG. 11) between the bottom surface (12d) of the shank and the edge (26b) of key-way 26 is simply the difference between the overall cutting height (B) for a particular shank and the fixed $B_2$ dimension, or $$B_1 = B - B_2.$$

Moreover, once the bottom edge (26b) of the key-way in one size shank (which can now be considered a reference shank) is located, the key-ways in other size shanks can be located simply by locating the bottom edge (26b) thereof at the same $B_1$ distance above the bottom surface (12d) of any other shank plus the difference between the overall heights (i.e., $A_2$ in FIG. 12) of such other shank and the "reference" shank.

Thus (referring to the dimensional references shown in FIGS. 11-12), regardless of the length (W in FIG. 11) of the cutting edge (17) associated with any head assembly, all head assemblies can be mounted to a particular shank and the cutting edge will automatically be located at the same height relative to the bottom surface (12d) of the shank. The same holds true for different size shanks, such as the progressively larger shanks shown in pahntom at 12' and 12" in FIGS. 2-4. Moreover, the F dimension for a given shank will automatically be achieved, regardless of what head assembly is used.

It will also be understood that the C dimension can also be automatically achieved for the shank of given length, regardless of the head assembly selected (except for the cut-off head assemblies described with reference to FIGS. 8-10). For this purpose, the distance (E in FIG. 11) from the back edge of support plate 18—i.e., surface 34—to the cutting edge of insert 16 is identical for each head assembly 14. Thus, when any head assembly is mounted to a given shank (or any shank having the same overall length), the C dimension of the resultant tool will automatically be the same.

Figure 11:
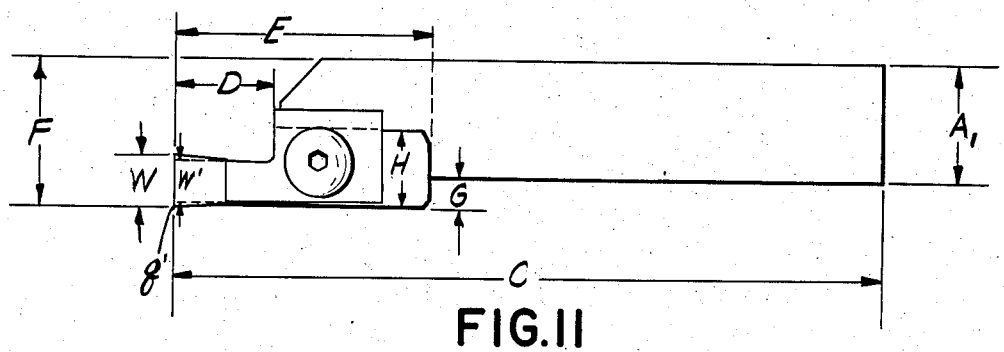
FIG. 11 is a schematic representation of a top view of the embodiment shown in FIG. 1, illustrating certain pertinent dimensions.
Figure 12:
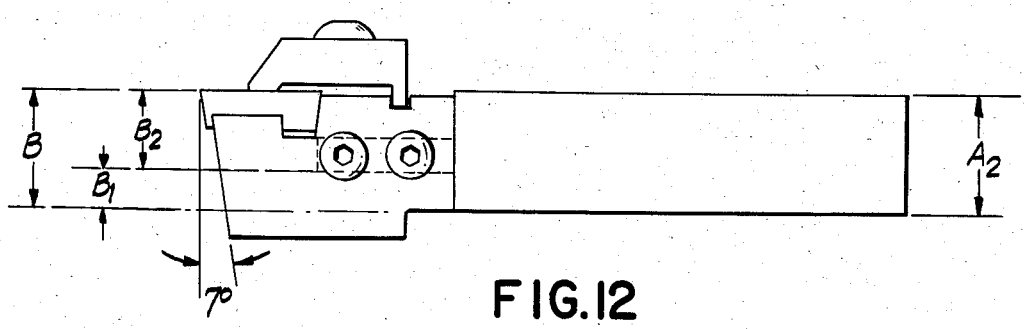
FIG. 12 is a schematic representation of a side view of the embodiment shown in FIG. 1, illustrating certain other dimensions.

Summarized in Table 1 are some exemplary embodiments of shanks, showing how the F and C dimensions remain the same, using the dimension symbols indicated in FIGS. 11-12. All dimensions are in inches.

TABLE I

| (SHANK) | | | | | | |
|---|---|---|---|---|---|---|
| B | $A_1$ | $A_2$ | C | F | G | $B_1$ |
| 1 | 1 | 1 | 7 | 1.25 | 0.25 | 0.25 |
| 1.25 | 1.25 | 1.25 | 8 | 1.50 | 0.25 | 0.50 |
| 1.25 | 1 | 1.25 | 7 | 1.25 | 0.25 | 0.50 |
| 1.50 | 1 | 1.50 | 8 | 1.25 | 0.25 | 0.75 |
| 1.50 | 1.50 | 1.50 | 8 | 2 | 0.50 | 0.75 |
| 2 | 2 | 2 | 10 | 2.50 | 0.50 | 1.25 |

Shown in Table II are exemplary embodiments of support plates 18 (each having the same thickness, H=0.65″) and inserts (16) which can be used with any of the shanks shown above, referring to the dimension symbols in FIGS. 11-13b. Since the support assemblies can use inserts of the double edge (or "dogbone") type, or the single edge type, these will be shown combined with different support blades.

TABLE II

| (HEAD ASSEMBLY) | | | | | | | | | |
|---|---|---|---|---|---|---|---|---|---|
| | SUPPORT BLADE | | | INSERT* | | | INSERT** | | |
| $B_2$ | W′ | D | E | W | T | L | W | T | L |
| 0.75 | .091 | 0.81 | 2.125 | | | | 0.125 | 0.14 | 1.00 |
| 0.75 | .122 | 0.81 | 2.125 | | | | 0.156 | 0.14 | 1.00 |
| 0.75 | .153 | 0.81 | 2.125 | | | | 0.187 | 0.20 | 1.00 |
| 0.75 | .216 | 0.81 | 2.125 | 0.250 | 0.244 | 0.875 | | | |
| 0.75 | .278 | 0.81 | 2.125 | 0.312 | 0.312 | 0.875 | | | |
| 0.75 | .341 | 0.81 | 2.125 | 0.375 | 0.312 | 0.875 | | | |

*Single edge
**Double edge

It will be understood that the dimension indicated at W is the actual length of the cutting edge (17) of the tool bit insert and that indicated at W′ is the actual width of the blade portion (18b) of the support plate. In addition, the cutting height (B) is preferably equal to the distance ($A_2$) between the top and bottom surfaces of the shank so that the distance from edge 26b of key-way 26 to the top surface of shank 12 can also be fixed and made equal to the distance ($B_2$) from the bottom edge (36b) of key 36 to the cutting edge (17) on any head assembly (i.e., 0.75″).

In any event, it will be seen from the foregoing tables that any head assembly can be used with any shank and the proper cutting height will always be achieved. Moreover, the corresponding F and C dimensions will also be equal for different head assemblies so that any head assembly will be automatically identically qualified for a given shank, or on any shank if the same E dimension is used.

It will be understood that the variation in the offset dimension (G in FIG. 11) between the 1″ thick (dimension $A_1$) shank and those that are thicker, simply reflects industry standards and not a charge in the thickness (H) of the support plate. Moreover, it will also be understood that in certain applications wherein the G dimension is used, instead of the F dimension, for qualification, the invention will also automatically provide identical qualification on a given shank, or on any shank if the same E dimension is used.

In forming a shank which is about one inch (1″) high between its top and bottom surfaces (12a and 12d, respectively) a small (about ¼″ high) club-head extension (indicated in phantom at 13 in FIGS. 5 and 6) is formed at the front end to provide additional material below key-way 26 for supporting the loads transmitted by key 36 during the grooving operation. The additional material will, thus, prevent the portion of the shank below bottom surface 26b from being sheared off during the grooving operation. Also, in forming the blade portion for thin cutting edges (i.e., less than about 0.125″) it may be preferable to shorten the length (i.e., dimension "D" in FIG. 11) of the blade portion, to prevent over-stressing.

It will be understood by those skilled in the art that the $B_2$ dimension can be formed by locating the groove (42) relative to edge 36b by the usual "roll dimension" techniques, adjusting for the slight difference between the "roll height" and the actual height (T) of the cutting edge above the vertex of V-groove 42.

Advantageously, the countersunk entry (39) to at least one borehole 38, and preferably both, is offset slightly forward (i.e., away from surface 34) relative to its corresponding threaded borehole (30) formed in shank 12, as indicated in phantom at 39′ in FIG. 2. In this way, as each screw 40 is tightened in its corresponding threaded hole 30, the cone-shaped tapered head of screw 40 engages the offset countersunk entry segment 39′ to "pull" the back edge (34) of support plate 18 back in firm abutting relation with surface 24a of the shank. Moreover, it will be found that by positioning of back surface 34 of support plate 18 directly against the front-facing surface (24a) of shank 12 obviates the need for back-up plates or other structures for properly locating the blade portion (18b).

In addition, as preferably embodied, the height of key 36 (as measured perpendicularly from surface 32) is dimensioned to be slightly shorter than the depth of key-way 26 so that there is a small gap (indicated at g in FIG. 3) of about 0.040″ between the outermost surface (36c) of key 36 and the "bottom" (26c) of key-way 26. Thus, as support plate 18 is securely fastened to shank 12, surfaces 36c and 26c will never abut each other, so that abutment between surfaces 32 and 24b can always be achieved. However, the tongue-and-groove type key-way/rib configuration, with surfaces 36a and 36b generally abutting surfaces 26a and 26b, respectively, together with the use of two threaded fasteners (40) ensures that support plate 18 cannot rotate about any axis parallel to the boreholes 30/38, nor can it be sheared off during the grooving operation. To the latter end, key 36 (and key-way 26) is preferably about ⅛″ wide and about ⅛″ tall.

A cylindrical bore (50) of enlarged depth and width relative to key-way 26 may be formed in shank 12 at the end of the key-way, adjacent surfaces 24a and 24b to facilitate milling shank 12 for the key-way. In addition, the enlarged end portion of the key-way, provided by recess 50, ensures that there will be no obstructions to a snugly flush abutment of surfaces 34 and 24a.

Figure 8:
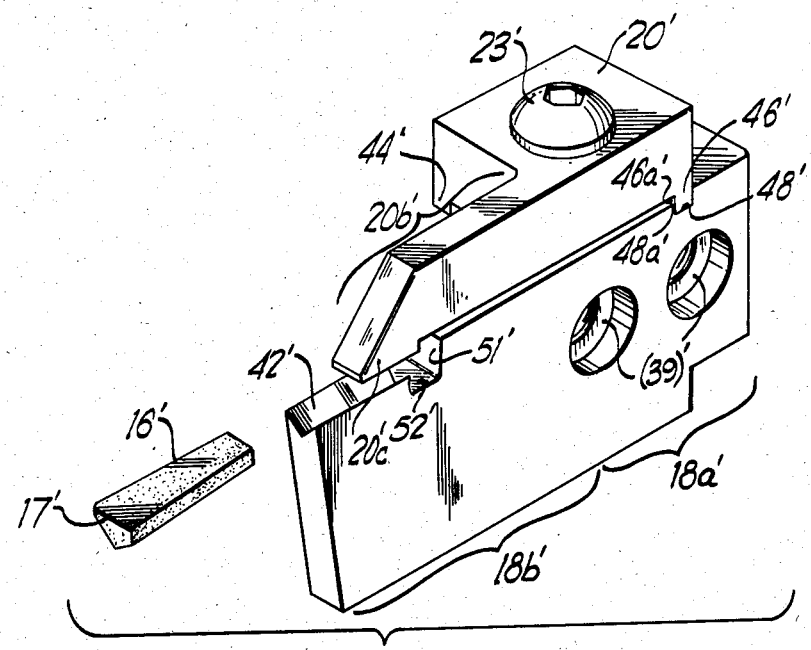
FIG. 8 is a perspective view of a tool bit support assembly according to another aspect of the invention.
Figure 9:
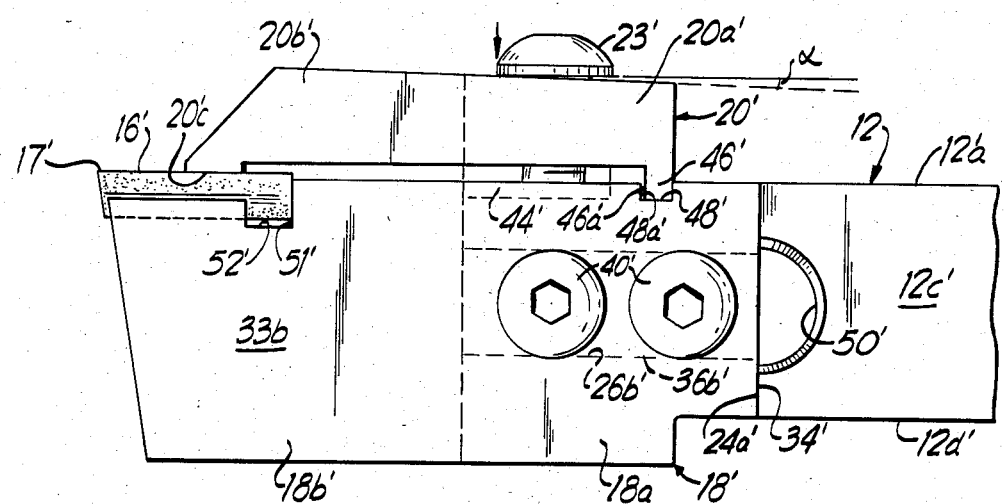
FIG. 9 is a side view of the support assembly shown in FIG. 8, mounted to a shank member.
Figure 10:
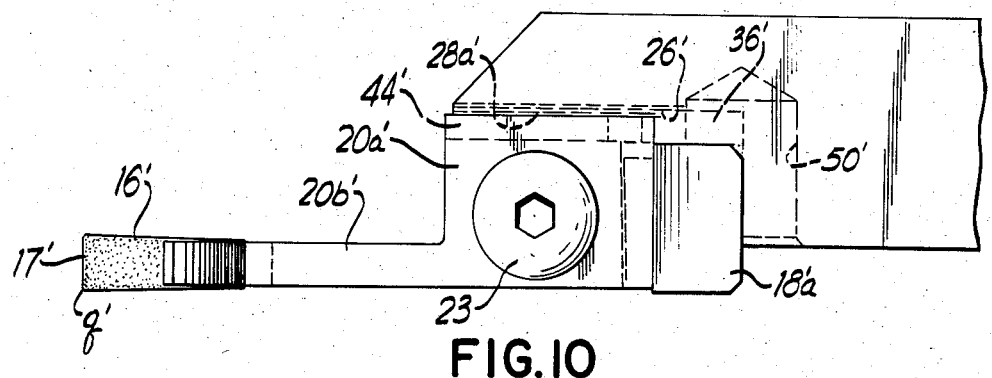
FIG. 10 is a top view of the structures shown in FIG. 9.

Turning now to FIGS. 8-10, there are shown various views of a modified embodiment of a machine tool part showing how the invention can be adapted for use as a cut-off tool bit assembly (indicated at 14′), as opposed to simply a grooving tool bit assembly. As here embodied, the tool bit assembly includes an elongated blade portion (18b′) of the support plate (18′) and an elongated arm portion (20b′) of the clamp member (20′).

It will be understood that the elongation of blade portion 18b and of arm portion 20b permits deeper penetration of the cutting edge (16b) of the tool bit insert to provide enough clearance between the workpiece and the front edge of shank 12 when the cutting edge cuts through the workpiece—particularly, a solid bar—so that neither the tool bit assembly nor the shank will be damaged by either portion of the workpiece. However, the clamping portion (20a') of clamp 20' and the support portion (18a') of support plate 18 are formed in precisely the same manner as described above, as is shank 12 so that cut-off head assemblies can be interchanged with grooving head assemblies on any shank and all dimensions except for the C dimension will automatically be identical for any given shank.

For an exemplary cut-off support plate (18' in FIGS. 8-10), the following dimensions may be used:

$$E = 2.875''; D = 1.56''$$

and any desired insert listed in Table II can be used. Thus, it will be understood that a cut-off support plate is essentially identical to any grooving support plate (FIGS. 2-4) except for an elongated blade portion (18b') and the corresponding clamp arm portion (20b').

It will be understood that the blade portion of either a grooving tool bit assembly (FIGS. 1-4) or a cut-off/grooving tool bit assembly (FIGS. 8-10) may be formed with the usual structures for supporting the tool bit insert, such as, for example, a notch (52) at the inward edge of the insert-locating groove (42) for facilitating formation of the V-shaped groove on blade portion 18b. Moreover, it will be understood that the back-stop surface (51) formed by notch 52 should be formed at about the same angle as the end edge of a double-ended insert to prevent damage to the cutting edge.

Figure 13A:
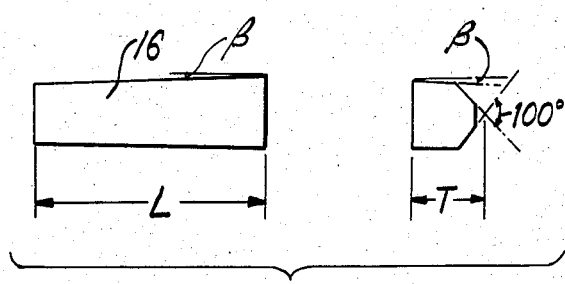
FIGS. 13a and 13b are schematic dimensional representations, each showing plan and end views of tool bit inserts for use with the embodiment illustrated in FIGS. 1–10.
Figure 13B:
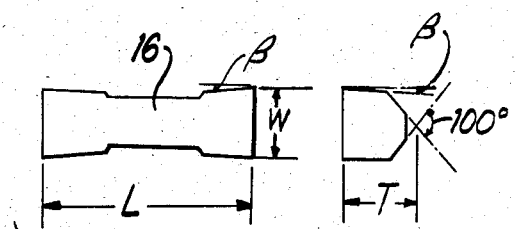

It will also be understood that the location of the back-stop surface (51) against which the tool bit insert abuts can be suitably located (as by the location of notch 52) to accommodate any length insert and provide identical support plate lengths (i.e., dimension E in FIG. 11). Also shown in FIGS. 13a and 13b are tapered surfaces on teh inserts (each indicated at B). For ease of fabrication, all angles B are identical and are about 2⅛° (although it can range up to about 5°) to provide sufficient clearance around the cutting edge for preventing "scrubbing" between the insert and the workpiece groove and, therefore, increase insert life.

It will be readily appreciated by those skilled in the art that the invention in its broader aspects is not limited to the specific embodiments herein shown and described.

Thus, for example, the key (36) could be formed on the shank and the key-way (26) formed on the support plate, although it is preferred that the key be formed on the support plate to avoid any possible structural weakness due to the removal of material to form the key-way. Moreover, although the invention has been disclosed with reference to grooving and cut-off machine tools, it can easily be adapted to face-grooving tools simply by forming the blade portion (18b) and the arm portion (20b) to a curved contour.

Therefore, variations may be made from the embodiments disclosed herein, which are within the scope of the accompanying claims, without departing from the principles of the invention or sacrificing its chief advantages.

What is claimed is:

1. A grooving tool assembly for machine tools such as lathes and the like, which comprises:

a relatively elongate shank adapted to be secured in a predetermined location on the machine tool with its front end generally exposed for positioning in proximity to a workpiece which is operatively mounted to the machine tool, said shank having a fixed reference surface and a corner-like cut-out defining a side-facing surface and a front-facing surface;

a tool bit head assembly adapted to be securely mounted to said shank, generally adjacent said cut-out at the front end of said shank, said head assembly including:

a tool bit insert having a cutting edge of predetermined length, a support plate member adapted to provide a seat for the insert, said support plate formed with a mounting portion for mounting said support plate member to said shank and a blade portion adapted to provide a seat for the insert, a clamp member adapted to be secured to said tooling assembly to clamp said insert in the seat in said blade portion, said clamp member including a base portion adapted to be fastened to said mounting portion of said support plate and an arm portion extending directly over the blade portion of said support;

a slot-like key-way formed in said side-facing surface of said shank and extending generally in the front-to-rear direction of said shank;

a key formed on and projecting outwardly from said mounting portion on said head assembly, said key being positioned and proportioned to correspond generally to said key-way and adapted to be interlockably received in said key-way when said head assembly is mounted to said shank;

locating means formed on said clamp for cooperating essentially only with said support plate member to position said arm portion in desired position over said insert, said locating means including:

a first rib formed on said base portion of said clamp member, extending adjacent a side edge thereof and projecting downwardly from its bottom, an edge of said first rib being adapted to abut said mounting portion of said support plate along a portion of the surface on which said key is formed, a second rib formed on said base portion of said clamp member, extending adjacent another side edge thereof and projecting downwardly from its bottom, and a slot-like recess formed in said mounting portion of said support plate, said recess adapted to receive said second rib when said clamp member is fastened to said support plate;

means for securing said support plate member to said shank;

means for securing said clamp to said support plate member;

a first identifiable location being formed on a front-to-rear extending edge of said key, said first identifiable location being located a fixed distance from the insert cutting edge; and a second identifiable location being formed on the edge of said key-way which is adapted to abut said front-to-rear-extending edge of said key, said second identifiable location being essentially parallel to and located a determinable distance from the reference surface on said shank, the additive sum of said fixed distance and said determinable distance being equal to a desired cutting height between said cutting edge and said reference surface, such that any other head assembly formed with said fixed distance between its cutting edge and a position corresponding to said first identifiable location can be interchanged with said head assembly without altering said desired cutting height.

2. The tool assembly according to claim 1, wherein said first identifiable location is the lowermost front-to-rear extending edge portion of said key and said second identifiable location is the key-way edge which abuts said lowermost edge portion of said key when said head assembly is mounted to said shank, and wherein said reference surface is the bottom surface of said shank.

3. The tooling assembly according to claim 1, wherein said ribs extend orthogonally to each other and said second rib is formed on the back side edge of said clamp.

4. The tooling assembly according to claim 3, wherein said shank includes a slot-like notch formed in said side-facing surface adjacent the top surface of said shank, said notch adapted to accommodate said first rib.

5. The tooling assembly according to claim 4, wherein a side-facing surface portion of said notch is proportioned to abut a portion of said first rib when said clamp member rotates beyond a predetermined point such that permissible rotational excursion of the arm portion of said clamp is maintained within a pair of parallel lines each intersecting an end edge of said cutting edge.

6. The tooling assembly according to claim 5, wherein said clamp member is fastened to said support by a threaded fastener extending through a first aperture formed in said clamp and threaded into a threaded hole formed in said mounting portion, said first aperture located as far forward of said second rib as possible to maximize the clamping leverage exerted on the insert, relative to said second rib.

7. A method of forming tool parts for machine tools and the like, which comprises the steps of:
   forming a cut-out in a relatively elongate shank having a longitudinal axis extending from its front to its back end, said cut-out providing a side-facing surface and permitting mounting of a tool bit head assembly adjacent the side-facing surface, the head assembly including a tool bit insert having a cutting edge, a support plate adapted to be mounted to the shank and to provide a seat for the tool bit insert, and clamp means adapted to retain the insert in its seat on the support plate, said clamp means including a clamping arm adapted to hold the insert against the seat;
   providing attachment means associated between the cut-out portion of the shank and the head assembly for locating the cutting edge at a predetermined cutting height relative to the bottom surface of the shank by:
   locating one identifiable edge of the portion of the attachment means formed on the shank at a first predetermined distance from the bottom of the shank,
   locating the cutting edge at a fixed distance from a second identifiable edge of the portion of the attachment means formed on the head assembly, said one and second identifiable edges generally coinciding when the head assembly is mounted to the shank,
   selecting the fixed distance and the first predetermined distance so as to add up to the predetermined cutting height relative to the bottom of the shank,
   forming, as part of said attachment means, a key which projects from one of the side-facing surface of said cut-out portion in the shank and the surface of said head assembly which is adjacent said side-facing surface when mounted thereto, and
   forming, as another part of the attachment means, a key-way in the other of the side-facing surface of said cut-out and said adjacent surface of said head assembly, the key-way corresponding substantially to the configuration of said key to permit a cooperating interlocking relation between the key and the key-way when the head assembly is mounted to the shank; and
   forming a pair of mutually perpendicular edge members on said support plate and a pair of mutually perpendicular ribs projecting downwardly from the bottom of said clamp means for abutting said mutually perpendicular edge members to locate said clamping arm relative to the insert, such that a plurality of head assemblies can be formed, each having its cut-edge located said fixed distance from a position corresponding to said second identifiable edge on the portion of the attachment means formed thereon, to enable any of said head assemblies to be mounted to the shank yet automatically locate the cutting edge at said predetermined cutting height relative to said bottom reference.

8. A method according to claim 7, wherein said key is formed on said adjacent surface of said head assembly and said key-way is formed on said side-facing surface of said cut-out and wherein said one identifiable edge is formed along the lowermost edge portion of said key-way and said second identifiable edge is formed along the lowermost edge portion of said key.

9. A method according to claim 8, wherein said one identifiable edge is formed on a front-to-rear-extending edge portion of said key and wherein said fixed distance is measured from the edge of said key-way which abuts said front-to-rear-extending edge of said key.

* * * * *